United States Patent [19]

Zweig

[11] 4,208,315

[45] Jun. 17, 1980

[54] FOOTWEAR COMPOSITION OF A BLEND OF ETHYLENE-VINYL ACETATE COPOLYMER, POLY(VINYL CHLORIDE) AND A BLOCK COPOLYMER

[75] Inventor: Judith E. Zweig, Houston, Tex.

[73] Assignee: Shell Oil Company, Houston, Tex.

[21] Appl. No.: 8,658

[22] Filed: Feb. 1, 1979

[51] Int. Cl.$^2$ .................... B01F 9/08; C08L 51/00; C08L 53/00
[52] U.S. Cl. ................ 260/33.6 AQ; 260/33.6 UA; 260/42.32; 260/42.34; 260/42.37; 260/42.47; 525/89; 525/96
[58] Field of Search .................................. 525/89, 96; 260/33.6 AQ, 36.6 UA, 42.32, 42.34, 42.37, 42.47

[56] References Cited

U.S. PATENT DOCUMENTS

| | | | |
|---|---|---|---|
| Re. 28,236 | 11/1974 | Hendricks et al. | 36/2.5 R |
| 3,594,452 | 7/1971 | De La Mare et al. | 260/880 |
| 3,595,942 | 7/1971 | Wald et al. | 260/880 |
| 3,695,477 | 10/1972 | Edmonston et al. | 215/40 |
| 3,769,417 | 10/1973 | van Breen | 424/78 |
| 3,801,529 | 4/1974 | Potter | 260/30.6 R |

*Primary Examiner*—Richard B. Turer
*Attorney, Agent, or Firm*—Dean F. Vance

[57] ABSTRACT

A non-delaminating polymeric composition having a smooth appearance along with improved flex crack resistance and detergent resistance is prepared by first blending together a vinyl chloride resin and an ethylene/vinyl acetate copolymer, and then blending in a monoalkenyl arene-diene block copolymer, hydrocarbon extending oil and filler under essentially isoviscous blending conditions.

8 Claims, 1 Drawing Figure

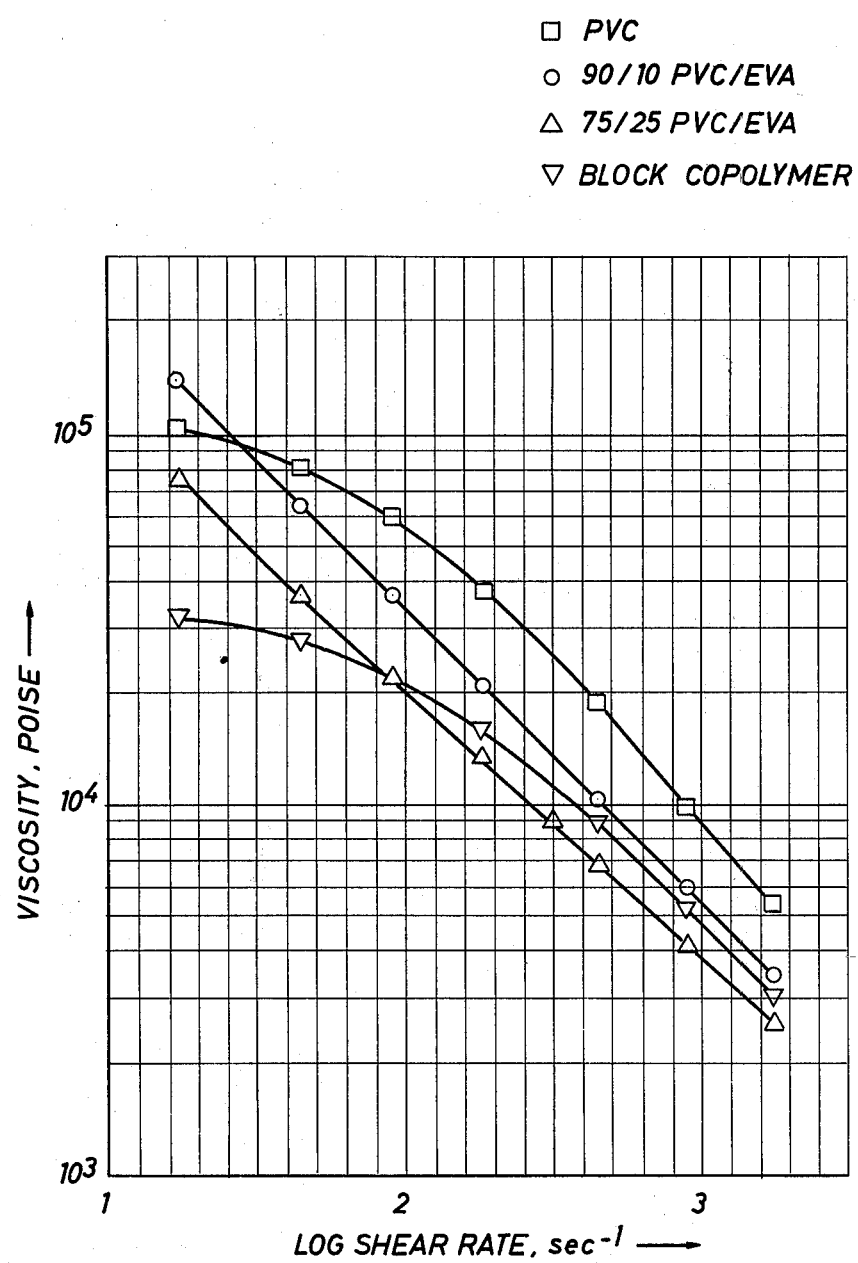

FOOTWEAR COMPOSITION OF A BLEND OF ETHYLENE-VINYL ACETATE COPOLYMER, POLY(VINYL CHLORIDE) AND A BLOCK COPOLYMER

BACKGROUND OF THE INVENTION

The use of certain block copolymers and their compounds in a number of end-uses and especially in footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al, U.S. Pat. No. Re. 28,236. In general, these shoe component compositions usually comprise a mixture of block copolymer, extending oil, polystyrene and possibly a filler. For the most part, these block copolymers have proved to be particularly advantageous in many respects, including flexibility, processability, lack of vulcanization requirement and wet slip. However, in certain respects, shortcomings have been noted. For example, commercial compounds should be free from delamination, free from elephant hide, and free from flow markings and marring. With respect to many styles in the casual and dress shoe area of footwear, one of the major shortcomings of the block copolymer compounds such as those referred to in U.S. Pat. No. Re. 28,236 is the lack of the smooth appearance. Present block copolymer compounds lack the smooth, relatively unblemished surface which is characteristic of compression molded vulcanized conventional rubber, injection molded polyvinyl chloride, or leather.

With regard to polyvinyl chloride, attempts have been made in the past to blend styrene-diene block copolymers with polyvinyl chloride. However, it has always been necessary in the past to include in the composition a PVC plasticizer. For example, in Potter, U.S. Pat. No. 3,801,529, the patentee adds a phosphate plasticizer having a solubility parameter between about 8.0 and 11.0 in order to compatibilize the block copolymer and PVC. Likewise, in Edmonston et al, U.S. Pat. No. 3,695,477, and Van Breen, U.S. Pat. No. 3,769,417, the patentees required the use of PVC plasticizers. However, the addition of these plasticizers to PVC and styrene-diene block copolymers effectively destroys the domain structure of the styrene end blocks in the block copolymer, drastically effecting the properties of the polymeric compositions. Accordingly, plasticized PVC/styrene-diene block copolymer blends are not useful for footwear. A new composition has now been found that eliminates the necessity for using typical PVC plasticizers.

SUMMARY OF THE INVENTION

The present invention broadly comprises a non-delaminating polymeric composition useful for footwear prepared by first melt blending a vinyl chloride resin and an ethylene-vinyl acetate copolymer to form a melt alloy in a weight ratio of vinyl chloride resin to ethylene-vinyl acetate copolymer of between about 95:5 and about 50:50 and then melt blending from about 5 to less than 35 parts by weight of said melt alloy with:
 (a) 100 parts by weight of a block copolymer having at least two monoalkenyl arene polymer end blocks A and at least one conjugated diene mid block B, each block A having an average molecular weight between about 5,000 and 25,000 and each block B having an average molecular weight between about 15,000 and about 200,000, said blocks A comprising 8–65% by weight of the copolymer;
 (b) about 0 to about 200 parts by weight of a hydrocarbon rubber extending oil; and
 (c) about 0 to about 250 parts by weight of a finely divided filler; wherein the melt blending takes place in the absence of any PVC plasticizers and wherein the viscosity ratio of the block copolymer viscosity divided by the viscosity of the melt alloy is between about 0.2 and about 4.0 at the melt processing temperature.

The resulting composition is especially suitable in unit soles for many styles in casual and dress shoes since it has a smooth appearance similar to that of PVC shoes. In addition, the present compositions are non-delaminating, have improved flex-crack resistance, and possess improved detergent resistance.

Each of the various components herein employed is significant. The block copolymer must have a certain styrene block molecular weight. Below 5000 molecular weight, domain formation does not occur, and therefore the block copolymer will not possess true thermoplastic elastomeric properties. Above 25,000 molecular weight, it is not possible to readily blend the block copolymer with the other polymers and obtain a non-delaminating blend.

A key aspect of the present invention is the method and order of mixing the various components. When one mixes a styrene-butadiene block copolymer, oil, filler, PVC and EVA all together at the same time, the resulting blend from the mixer is lumpy and delaminating and is not a useful blend. It is an essential aspect of the present invention that the vinyl chloride resin and EVA copolymer be premixed prior to the addition of the other components. The reason for this has to do with the viscosity characteristics of the PVC. The viscosity of the typical PVC resin is much higher than the viscosity of the monoalkenyl arene-diene block copolymer. Accordingly, it has not been possible in the past to blend such block copolymers with PVC unless the PVC is first plasticized with a common plasticizer. The EVA copolymer acts in an analogous manner to the PVC plasticizer, but does not destroy the domain formation of the block copolymer as does the typical PVC plasticizer.

The relative amount of PVC to EVA is also critical, as is the amount of the resulting melt alloy employed. It has been experimentally shown that blends containing 50 parts of a 75/25 PVC/EVA alloy and 50 parts of a styrene-butadiene-styrene block copolymer possess macroscopic inhomogeneities in a compression molded thin sheet. Likewise, blends containing 35 parts of the alloy and 65 parts of the block copolymer showed non-uniform concentrations of PVC in the S-B-S matrix in SEM photographs. However, blends containing 20 parts of the alloy and 80 parts of the block copolymer displayed macroscopic and microscopic homogeneity as evidenced by homogeneous thin sheets, as well as a uniform dispersion of PVC in the S-B-S matrix in SEM photographs. Injection molded Beloit plaques of all but the 50/50 blend showed a homogeneous, non-delaminating, rubbery material with good physical properties.

It is possible to blend the PVC/EVA alloy with the block copolymer and achieve compatible, non-delaminating blends even in the absence of typical PVC plasticizers by use of the techniques of essentially matching the viscosity of the alloy with the viscosity of the block copolymer. This is accomplished by the selection of the various polymeric components so that the viscosity ratio of the block copolymer viscosity divided by the viscosity of the melt alloy is between about 0.2 and about 4.0 at the melt processing temperature. This viscosity matching is graphically portrayed in the curves discussed in Illustrative Embodiment I which follows.

DETAILED DESCRIPTION OF THE INVENTION

The block copolymers employed in the present composition are thermoplastic elastomers and have at least two monoalkenayl arene polymer end blocks A and at least one elastomeric conjugated diene polymer mid block B. The number of blocks in the block copolymer is not of special importance and the macromolecular configuration may be linear, graft or radial (branched) depending upon the method by which the block copolymer is formed. Preferred is a linear ABA block copolymer. Typical block copolymers of the most simple configuration would have the structure polystyrene-polybutadiene-polystyrene. A typical radial polymer would comprise one in which the diene block has three or more braches, the tip of each branch being connected to a polystyrene block. See U.S. Pat. No. 3,594,452. Expressed another way, the invention also contemplates (but is not limited to) the use of configurations such as A-B-(-B-A)$_n$ where n varies from 1 to 15. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene. Blends of two or more block copolymers may also be employed.

The average molecular weights of each of the blocks may be varied as desired. The monoalkenyl arene polymer blocks preferably have number average molecular weights between about 5,000 and about 25,000, more preferably between about 8,000 and about 20,000. The elastomeric conjugated diene polymer block preferably have number average molecular weights between about 15,000 and about 200,000, more preferably between about 25,000 and about 150,000. The average molecular weights of the polystyrene end blocks are determined by gel permeation chromotography, whereas the polystyrene content of the polymer is measured by infrared spectroscopy of the finished block polymer. The weight percentage of the thermoplastic monoalkenyl arene blocks in the finished block polymer should be between about 8% and 65%, preferably between about 20% and about 50% by weight. The general type and preparation of these block copolymers are described in U.S. Pat. No. Re. 28,246 and in many other U.S. and foreign patents.

The block copolymers useful in the compositions of this invention may also be hydrogenated either selectively, randomly or completely. Selected conditions may be employed, for example, to hydrogenate the elastomeric diene center block while not so modifying the monoalkenyl arene polymer blocks. One example of a hydrogenated polymer is polystyrene-hydrogenated polybutadiene-polystyrene. Preferably, blocks A are characterized in that no more than about 25% of the original aromatic double bonds are reduced by hydrogenation while blocks B are characterized by having at least 75% of the aliphatic double bonds reduced by hydrogenation. See generally U.S. Pat. No. 3,595,942.

The vinyl chloride resins comprising one of the several classes of polymers useful in compositions in accordance with this invention may be either homopolymeric polyvinyl chloride or its copolymers and are well known in the prior art. These include vinyl chloride-vinyl acetate copolymers, vinyl chloride-vinylidene chloride copolymers, vinyl chloride-fumarate copolymers, vinyl chloride-maleate copolymers, vinyl chloride-acrylic ester copolymers, vinyl chloride-acrylonitrile copolymers, vinyl chloride-alkyl vinyl ether copolymers, and vinyl chloride-olefin copolymers. These vinyl chloride copolymers may be either random, graft or block copolymers and may be either linear or branched in their configurations. While molecular weight does not form an essential aspect of the present invention, the usual molecular weight range is between about 20,000 and 500,000, normally between about 30,000 and 100,000. A much preferred vinyl chloride resin is homopolymeric polyvinyl chloride (PVC). A very suitable PVC is B. F. Goodrich's Geon 8700.

The ethylene-vinyl acetate copolymers which are to be used in the compositions of the invention correspond to the general formula

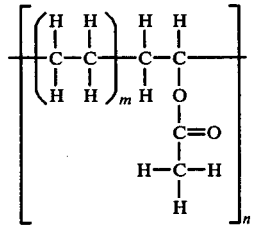

wherein n ranges from about 15 to about 250. The actual occurrence of the acetate substituents along the hydrocarbon chain is of a random character and thus the letter m denotes the average number of ethylene units per vinyl acetate unit in the molecule rather than the presence of regularly recurrent units having the composition given within the above brackets. The value for m ranges from about 6.5 to 40 and preferably from about 8 to 30. The most useful melt indicies range from about 0.1 to about 2 grams per 10 minutes. An excellent copolymer is DuPont's Alathon 3175 which has a melt index of 6 and contains about 28% vinyl acetate.

The vinyl chloride resin and ethylene-vinyl acetate copolymer are first melt blended together in the absence of typical PVC plasticizers, such as those disclosed in the patents cited in the Background of the Invention. The ratio of vinyl chloride resin to ethylene-vinyl acetate copolymer is between about 95:5 and about 50:50, preferably between about 90:10 and about 70:30. The amount of the resulting melt alloy employed is between about 5 and about 35 parts by weight, preferably between about 10 and about 25 parts by weight.

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500

SSU at 100° F. Commercial extending oils include SHELLFLEX® oils, No's. 310, 371 and 311 (which is a blend of 310 and 371). The amount of extending oil employed varies from about 0-200 phr preferably from about 25-100 phr.

The fillers used in the present compositions are well known in the art and include clay, talc, silica, titanium dioxide, carbon blacks, calcium carbonate, and other pigments as well as fibrous fillers such as cellulosic fibers, sawdust, ground cork, etc.

Preferred fillers include silica and calcium carbonate. The amount of filler employed varies from 0-250 phr, preferably 5-60 phr. Additional minor amounts of antioxidants, ultra-violet stabilizers and the like may also be added.

As disclosed above, it is an essential aspect of the present invention that the vinyl chloride resin and the ethylene-vinyl acetate copolymer be preblended prior to addition of the block copolymer. Then the other components may be added to the melt alloy.

While the present specification emphasizes the use of these compositions in footwear components, other end-uses also are contemplated. These include, for example, automotive parts and wire and cable coatings. Tubular products such as hoses and the like also are contemplated.

The use of the present composition in footwear includes especially their use in soling when prepared by injection molding and slab soling, such as produced by cutting shoe sole forms from extruded slab-stock. The advantages of the present compositions are most apparent in injection molding of unit soles which are later attached by adhesion or sewing to uppers. In this situation, it has been found that the unit soles are readily removed from the injection mold and have reduced weld line formation on the surface. Furthermore, the sole so produced is resistant to delamination and has a smooth appearance. These unit soles (which term refers in the trade to a sole including an integral heel portion) are useful both as a leather replacement and as an improvement over the prior art vinyl soles. The compositions also may be used in the manufacture of injection molded canvas shoe soles wherein the soling is directly injection molded onto the canvas upper.

The invention is further illustrated by means of the following illustrative embodiment, which is given for the purpose of illustration alone and is not meant to limit the invention to the particular reactants and amounts disclosed.

ILLUSTRATIVE EMBODIMENT I

In Illustrative Embodiment I, various compositions were prepared according to the present invention. In all examples, except Z-44, the block copolymer was a linear styrene-butadiene-styrene block copolymer having a molecular weight distribution according to the present invention. In example Z-44, the block copolymer was a blend of two SBS block copolymers of differing molecular weights, the weighted average molecular weights being according to the present invention. All examples contained a standard antioxidant.

The other components employed herein are listed below:

| | |
|---|---|
| Oil | — Shellflex® 311 hydrocarbon oil |
| Fillers | — Hil Sil - silicon dioxide |
| | Vicron - calcium carbonate |
| PVC | — B.F. Goodrich Geon 8700 homopolymeric polyvinyl chloride |
| EVA | — DuPont Alathon 3175 ethylene-vinyl acetate copolymer having a vinyl acetate content of 28%. |

Initially, the PVC and EVA were blended together on a Banbury Mixer at about 290° C. for a total mix time of about 2 minutes.

The PVC/EVA melt alloy, block copolymer, oil and filler were then mixed together on a Banbury Mixer at about 320° C. for a total mix time of about 3 minutes.

The importance of having a certain order of mixing is shown in FIG. 1. Viscosity-shear rate curves were measured for the PVC, two different blends of PVC and EVA, and for the linear SBS block copolymer (which contained 1 phr of a Kemamide E stabilizer). These curves, plotted in FIG. 1, show a big difference in viscosity between PVC and the block copolymer. However, the 75/25 blend of PVC and EVA has a viscosity-shear rate curve that is very compatible with the block copolymer.

After mixing, the samples of the various compositions were tested according to the following tests:

| Test | Standard Test Number |
|---|---|
| Shore A Hardness | D-2240 |
| Tinius Olsen Stiffness | D-747 |
| Taber Abrasion | D-1044 |
| Ross Cut Growth | D-1052 |

The various formulations and test results are presented below in Table I.

Table I

| Composition, Parts by Weight | Z-24 | Z-28 | Z-35 | Z-37 | Z-40 | Z-42 | Z-43* | Z-44 | Z-48 | Z-49 |
|---|---|---|---|---|---|---|---|---|---|---|
| Block Copolymer | 100 | 100 | 100 | 100 | 100 | 100 | 100 | 100 | 100 | 100 |
| PVC/EVA alloy | 25 | 25 | 25 | 25 | 25 | 25 | 25 | 25 | 25 | 25 |
| (ratio) | (75/25) | (90/10) | (75/25) | (75/25) | (75/25) | (75/25) | (75/25) | (75/25) | (75/25) | (75/25) |
| Oil | 0 | 10 | 50 | 75 | 50 | 50 | 50 | 50 | 50 | 50 |
| Filler, SiO₂ | 0 | 10 | 50 | 30 | 30 | 15 | 30 | 30 | 15 | 15 |
| CaCO₃ | — | — | — | — | — | 15 | — | — | 15 | 15 |
| Test Results | | | | | | | | | | |
| Shore A Hardness (Instant/10 sec.) | 70/66 | 68/65 | 58/55 | 40/37 | 50/47 | 46/43 | 53/49 | 50/47 | 48/45 | 53/50 |
| Ross Flex Cut Growth, (thousand flexes to 500% growth) | 229 | 280 | — | 215 | 307 | 329 | 180 | — | 238 | 314 |
| Taber Abrasion, (cc/kc) | 0.27 | 0.34 | 0.91 | 1.17 | 0.84 | 0.80 | 0.99 | 0.90 | .75 | .65 |
| Tensile Strength, (psi) | 560 | 450 | 235 | 145 | 375 | 435 | 415 | — | — | — |

Table I-continued

| Composition, Parts by Weight | Z-24 | Z-28 | Z-35 | Z-37 | Z-40 | Z-42 | Z-43* | Z-44 | Z-48 | Z-49 |
|---|---|---|---|---|---|---|---|---|---|---|
| Specific Gravity | 0.995 | 1.027 | 1.082 | 1.018 | 1.037 | 1.047 | 1.044 | 1.044 | 1.047 | 1.056 |

*10 parts of a high impact polystyrene was added
**10 parts of crystalline polystyrene was added

ILLUSTRATIVE EMBODIMENT II

In Illustrative Embodiment II, three additional blends were made. The blends were made in the same manner as in Illustrative I and with the same PVC, EVA and extending oil. However, block copolymers of differing molecular weight and structure were employed. Block copolymer A is the same as used in Illustrative Embodiment I. Block copolymer B is a linear styrene-butadiene-styrene block copolymer having higher molecular weight styrene end blocks and a higher total molecular weight than block copolymer A. Block copolymer C is a radial styrene-butadiene copolymer having higher molecular weight styrene end blocks and higher total molecular weight than either block copolymer A or B. All three block copolymers have molecular weights according to the present invention.

Unit soles were injection molded on a Lorenzin Model C machine from the blended compositions. The various formulations and results are shown below in Table II.

Table II

| Composition, Parts by Weight | H-43 | H-47 | H-48 |
|---|---|---|---|
| Block Copolymer A | | 50 | |
| Block Copolymer B | 100 | | |
| Block Copolymer C | | 50 | 100 |
| Oil | 57 | 57 | 62 |
| PVC | 65 | 65 | 65 |
| EVA | 22 | 22 | 22 |
| Test Results | | | |
| Weld Line Visibility | Moderate | Slight | Moderate |
| Mar Resistance | Moderate | Moderate | Moderate |
| Elephant Hide | Nil | Nil | Nil |
| Surface Dullness | Good | Good | Good |
| Delamination Tendency | Nil | Nil | Nil |
| Translucency | Slight | Slight | Slight |
| Melt Flow, Condition E, g/10 min. | 4.8 | 5.0 | — |
| Hardness, Injection Molded Unit Sole, Shore A (Instantaneous) | 59 | 56 | 55 |
| Trouser Tear Strength, parallel/normal to flow, kN/m (pli) | 27/21 (152/122) | 17/20 (99/113) | 18/20 (103/113) |
| Adhesion (peel strength), kN/m (pli) | 8.6 (49) | 8.4 (48) | 8.8 (50) |
| Ross Flex Cut Growth, kc to 500% | 208 | 760 | 1190 |
| Tinius Olsen Stiffness, kPa (psi) | 6070 (880) | 3240 (470) | 3100 (450) |
| Taber Abrasion Loss, cm³/kc | 0.97 | 0.61 | 1.12 |

I claim as my invention:

1. A non-delaminating polymeric composition useful for footwear prepared by first melt blending a vinyl chloride resin and an ethylene-vinyl acetate copolymer to form a melt alloy in a weight ratio of vinyl chloride resin to ethylene-vinyl acetate copolymer of between about 95:5 and about 50:50 and then melt blending from about 5 to less than 35 parts by weight of said melt alloy with:
   (a) 100 parts by weight of a block copolymer having at least two monoalkenyl arene polymer end blocks A and at least one conjugated diene mid block B, each block A having an average molecular weight between about 5,000 and 25,000 and each block B having an average molecular weight between about 15,000 and about 200,000, said blocks A comprising 8–65% by weight of the copolymer;
   (b) about 0 to about 200 parts by weight of a hydrocarbon rubber extending oil; and
   (c) about 0 to about 250 parts by weight of a finely divided filler;
wherein the melt blending takes place in the absence of any PVC plasticizers and wherein the viscosity ratio of the block copolymer viscosity divided by the viscosity of the melt alloy is between about 0.2 and about 4.0 at the melt processing temperature.

2. A composition according to claim 1 wherein said block copolymer is a styrene-butadiene-styrene block copolymer.

3. A composition according to claim 1 wherein said vinyl chloride resin is homopolymeric polyvinyl chloride.

4. A composition according to claim 1 wherein said ethylene-vinyl acetate copolymer has the general formula

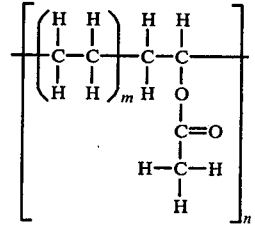

where n ranges from about 15 to about 250 and m ranges from about 6.5 to about 40.

5. A composition according to claim 1 wherein the amount of said hydrocarbon rubber extending oil is between about 25 and about 100 parts by weight.

6. A composition according to claim 5 wherein the amount of said filler is between about 5 and about 60 parts by weight.

7. A composition according to claim 1 wherein the amount of said melt alloy is between about 10 and about 25 parts by weight.

8. A composition according to claim 1 wherein said block copolymer is a combination of two different block copolymers.

* * * * *